United States Patent [19]

Baccus, Jr.

[11] Patent Number: 5,069,924

[45] Date of Patent: * Dec. 3, 1991

[54] LOW CALORIE BEVERAGE

[75] Inventor: John B. Baccus, Jr., Irving, Tex.

[73] Assignee: The Southland Corporation, Dallas, Tex.

[ * ] Notice: The portion of the term of this patent subsequent to Jan. 22, 2008 has been disclaimed.

[21] Appl. No.: 629,115

[22] Filed: Dec. 17, 1990

Related U.S. Application Data

[63] Continuation of Ser. No. 341,781, Apr. 21, 1989, Pat. No. 4,986,994.

[51] Int. Cl.$^5$ .................................................. A23L 2/00
[52] U.S. Cl. .................................. 426/590; 426/330.3; 426/548
[58] Field of Search ............... 426/285, 548, 591, 590, 426/599, 569, 565, 567, 330.3, 330.5, 66, 67, 312

[56] References Cited

U.S. PATENT DOCUMENTS

| | | | |
|---|---|---|---|
| 3,476,571 | 11/1969 | Block | 426/548 |
| 3,510,310 | 5/1970 | Breckwoldt | 426/590 |
| 3,930,053 | 12/1975 | Japikse | 426/590 |
| 3,966,994 | 6/1976 | Kennedy | 426/590 |
| 4,051,268 | 9/1977 | Shires | 426/548 |
| 4,486,455 | 12/1984 | Wolf | 426/454 |
| 4,497,835 | 2/1985 | Winston | 426/73 |
| 4,626,441 | 12/1986 | Wolkstein | 426/548 |
| 4,690,827 | 9/1987 | Kupper | 426/548 |
| 4,790,999 | 12/1988 | Ashmont | 426/115 |
| 4,808,428 | 2/1989 | Forsstrom | 426/569 |
| 4,986,994 | 2/1991 | Baccus | 426/330.3 |

*Primary Examiner*—Carolyn Paden
*Attorney, Agent, or Firm*—Baker & Botts

[57] ABSTRACT

A process for preparing a low calorie beverage syrup generally comprising the steps of mixing water and an artificial sweetener until completely dissolved. Microcrystalline cellulose is added to the mixer and vigorously agitated for proper dispersion and hydration of the cellulose. Xanthan gum, which has been wetted by propylene glycol, is added to the mixture and properly mixed. While the mixture is being stirred, a natural sweetener solution, a foaming agent and flavoring are added to the mixture to complete the syrup used to make a low calorie slush beverage.

18 Claims, 2 Drawing Sheets

LOW CALORIE BEVERAGE

This application is a continuation of application Ser. No. 07/341,781, filed Apr. 21, 1989 and entitled "A Process For Making A Low Calorie Beverage", now U.S. Pat. No. 4,986,994, issued Jan. 22, 1991.

TECHNICAL FIELD OF THE INVENTION

This invention relates in general to a low calorie beverage and in particular to a low calorie slush beverage having small ice crystals formed evenly therethrough and a process for producing such beverage.

BACKGROUND OF THE INVENTION

As low calorie beverages such as diet soft drinks have become more popular due to recent developments in artificial sweeteners, consumer demand for additional types of palatable drinks has increased. A demand has thus developed for a diet soft drink, or low calorie beverage, which is semi-frozen. Beverages having a semi-frozen or slushy consistency have previously been developed and successfully distributed in the past, but the slushy drinks have had relatively high calorie content.

In the past, the beverage industry has been unable to successfully manufacture a low calorie syrup capable of being used in conventional semi-frozen beverage-making machines. Only syrups having a high percentage of natural sweeteners have been heretofore used in conventional semi-frozen beverage-making machines because of temperature limitations. Generally, such slush machines operate at temperatures between 26 to 28 degrees Fahrenheit, and conventional solutions containing artificial sweeteners tend to freeze in the machine to create extreme operational problems. For example, previously attempted slush drinks using artificial sweeteners have frozen in the machines, cracking or breaking impellers in the machines.

A need has therefore arisen for a low calorie slush beverage with a depressed freezing point to accommodate the low temperatures in a conventional slush beverage machine in order to provide a low calorie slush drink with similar texture and flavor as previous high calorie slush drinks.

SUMMARY OF THE INVENTION

An important aspect of the present invention comprises a process for preparing a low calorie beverage syrup. Initially, an artificial sweetener solution is mixed with cellulose until the solids are dissolved in a quantity of water. Next, a natural sweetener and foaming agent are added to the mixer. Finally, a flavoring solution is added to complete the syrup. More specifically, in the first mixing step, aspartame is completely dissolved. Microcrystalline cellulose is then added to the mixer and vigorously stirred for approximately 15 minutes. A mixture of propylene glycol and xanthan gum, which has been premixed to insure complete wetting of the xanthan gum, is then added to the mixture. A natural sweetener is then added to the mixture. A foaming agent, which may comprise saponin-containing substances such as 50% yucca extract and 50% quillaia extract, is added to the mixture. Finally, a flavoring solution is added to the mixture to obtain the desirable taste.

After the syrup has been produced, it is placed in a blending tank along with water and carbon dioxide to create a pre-cooled mixture of the low calorie beverage. The mixture is placed in a chamber having a temperature range between approximately 26 and 28 degrees Fahrenheit. The mixture is held in the chamber, which preferably has an internal rotating blade, until small ice crystals are formed to be evenly dispersed throughout the mixture. Finally, the low calorie beverage is poured out of the cylinder for consumption by the consumer.

The present invention presents technical advantages over the conventional low calorie beverage and other semi-frozen beverages because of the ability to produce a low calorie beverage with a desirable semi-frozen consistency, and which further is adaptable for formation in a conventional semi-frozen beverage-making machine.

BRIEF DESCRIPTION OF THE DRAWINGS

Other aspects of the invention and their advantages will be discerned after studying the Detailed Description in conjunction with the Drawings in which.

DETAILED DESCRIPTION OF THE INVENTION

Figure 1:
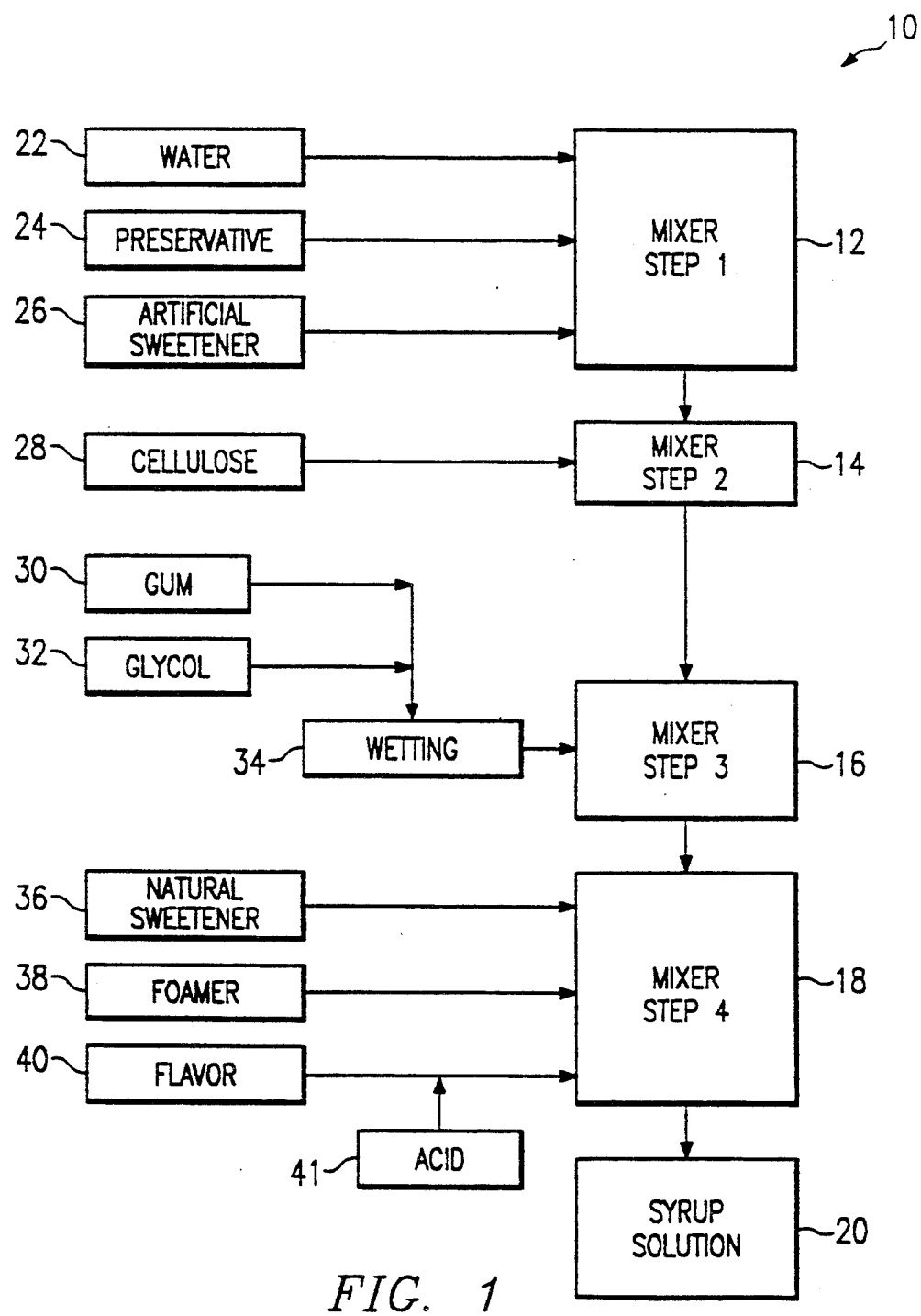
FIG. 1 is a block diagram of a low calorie beverage syrup manufacturing process according to the present invention.

Referring to FIG. 1, a process for producing a syrup necessary to manufacture a low calorie beverage is shown in a block diagram and is generally designated 10. Process 10 generally comprises a series of mixing steps 2, 14, 16 and 18. After a plurality of solutions have been added throughout the four mixing steps, a syrup solution 20 is produced which is subsequently put into canisters (not shown) for transportation to stores for further processing to make the low calorie beverage.

In FIG. 1, it can be seen that filtered water 22, a preservative 24, and an artificial sweetener 26 are added in mixing step 12. In its preferred embodiment, preservative 24 is a sodium benzoate USP grade manufactured by Kalama Chemical Incorporated. In an alternative embodiment, preservative 24 may be potassium sorbate solution. In its preferred embodiment, artificial sweetener 26 is aspartame. Artificial sweetener 26, in an alternative embodiment, can be saccharin, a mixture of aspartame and saccharin, or other suitable commercially available artificial sweeteners.

Syrup solution 20 comprises from 50 to 60 weight percent filtered water 22. Preservative 24 correspondingly comprises approximately 0.09 to 0.15 weight percent of syrup solution 20. Preferably, when using sodium benzoate as a preservative, it is desirable not to have a concentration higher than 0.15 weight percent in the finished syrup solution 20 because an "off" taste will begin to be noticeable. Artificial sweetener 26 may vary between approximately 0.11 and 0.13 weight percent of syrup solution 20 depending upon the desired taste of the final product.

Still referring to FIG. 1, water 22, preservative 24 and sweetener 26 are mixed at step 12 at a relatively high velocity until the solids are completely dissolved.

The mixing step 14 comprises adding microcrystalline cellulose 28. Microcrystalline cellulose 28 may vary between approximately 1.5 to 2.5 weight percent of syrup solution 20. In a preferred embodiment, microcrystalline cellulose 28 is approximately 1.79 weight percent of syrup solution 20 and may comprise for example Avicel CL-611 manufactured by FMC. The microcrystalline cellulose 28 should be present in a concentration sufficient to lower the freezing point of the low-calorie beverage to between 26° and 28° F. In mixing step 14, the mixture is vigorously agitated until the microcrystalline cellulose 28 is completely dispersed and hydrated to create a colloidal suspension.

Recently, the ice cream industry has used microcrystalline cellulose in low calorie ice creams to produce a desirable consistency which is palatable to individuals. This use in the ice cream industry has been found to be very advantageous for creating a solid or semi-solid ice cream. Using the microcrystalline cellulose in a beverage to create a pourable semi-frozen solution had not been successful until the present invention.

Prior to adding the solution in the next mixing step 16, a xanthan gum, 30 and propylene glycol 32 are added in a separate wetting step 34 and mixed to insure complete wetting of xanthan gum 30 by the propylene glycol 32. In alternative embodiments, the wetting agent can be glycerine or polysorbate-80. Wetting step 34 reduces the possibility that xanthan gum 30 will lump into clusters. Xanthan gum 30 and propylene glycol 32 make up between approximately 0.15 and 0.25 weight percent and between approximately 0.5 and 2.0 weight percent of syrup solution 20, respectively. The wetted xanthan gum 30 is added to and stirred in mixing step 16. Xanthan gum 30 functions to maintain the colloidal suspension of cellulose 28 and to build the viscosity of syrup solution 20. In an alternative embodiment, xanthan gum 30 may be replaced by gum tragacanth. Propylene glycol 32 functions as a manufacturing aid to wet xanthan gum 30 and to help depress the freezing point of the entire solution in subsequent processing. Special care is taken to limit the amount of propylene glycol 32 because of the bitter aftertaste which may be experienced if too much is used.

After proper mixing has been conducted at step 16, the process proceeds to a fourth mixing step 18. Initially, natural sweetener 36 is added. Natural sweetener 36 may be one or a combination of fructose, sucrose, dextrose, or malto-dextrin.

A desirable finished product has also been prepared using a polydextrose solution in place of the above natural sweeteners. Polydextrose has the added advantage of having only 25 percent of the calorie content of conventional natural sweeteners.

Natural sweetener 36 makes up between approximately 27.3 and 47.3 weight percent of syrup solution 20. Preferably, natural sweetener 36 makes up approximately 37.3 weight percent of syrup solution 20, and the natural sweetener 36 itself is made of 71 weight percent fructose. The natural sweetener 36 may vary in fructose concentration, with more or less filtered water 22 being added to adjust the final concentration of fructose within syrup solution 20. The second part of the mixing step 18 comprises the step of adding a foaming agent 38. Foaming agent 38 preferably comprises a 50%-50% mixture of a yucca extract and a quillaia extract distributed by Bell Chemical under the trademark Super Foam$^{TM}$ foaming agent. The active ingredient of both yucca extract and quillaia is saponin, which stabilizes the foam after it has been generated. It has been found that an acceptable beverage can be produced which has foaming agent 38 made of 100% yucca extract. After adding foaming agent 38, flavor 40 is added and the entire solution is mixed until there is complete blending of all the ingredients.

When using a cola flavoring, no further step is necessary to complete the formation of syrup solution 20. However, when other flavors such as strawberry or cherry are used to make syrup solution 20, citric acid 41 is added to the flavor stream to enhance the taste of syrup solution 20. In the case of cola, phosphoric acid is already contained within the cola solution. Citric acid 41 is added last because it tends to retard hydration of microcrystalline cellulose 28 contained in syrup solution 20. In an alternative embodiment, citric acid 41 may be replaced by malic acid. As can be appreciated, many flavors 40 can be added to create the desired flavor of syrup solution 20, such as: cola, orange, lime, lemon-lime, creme soda, cherry, strawberry, or grape.

Figure 2:
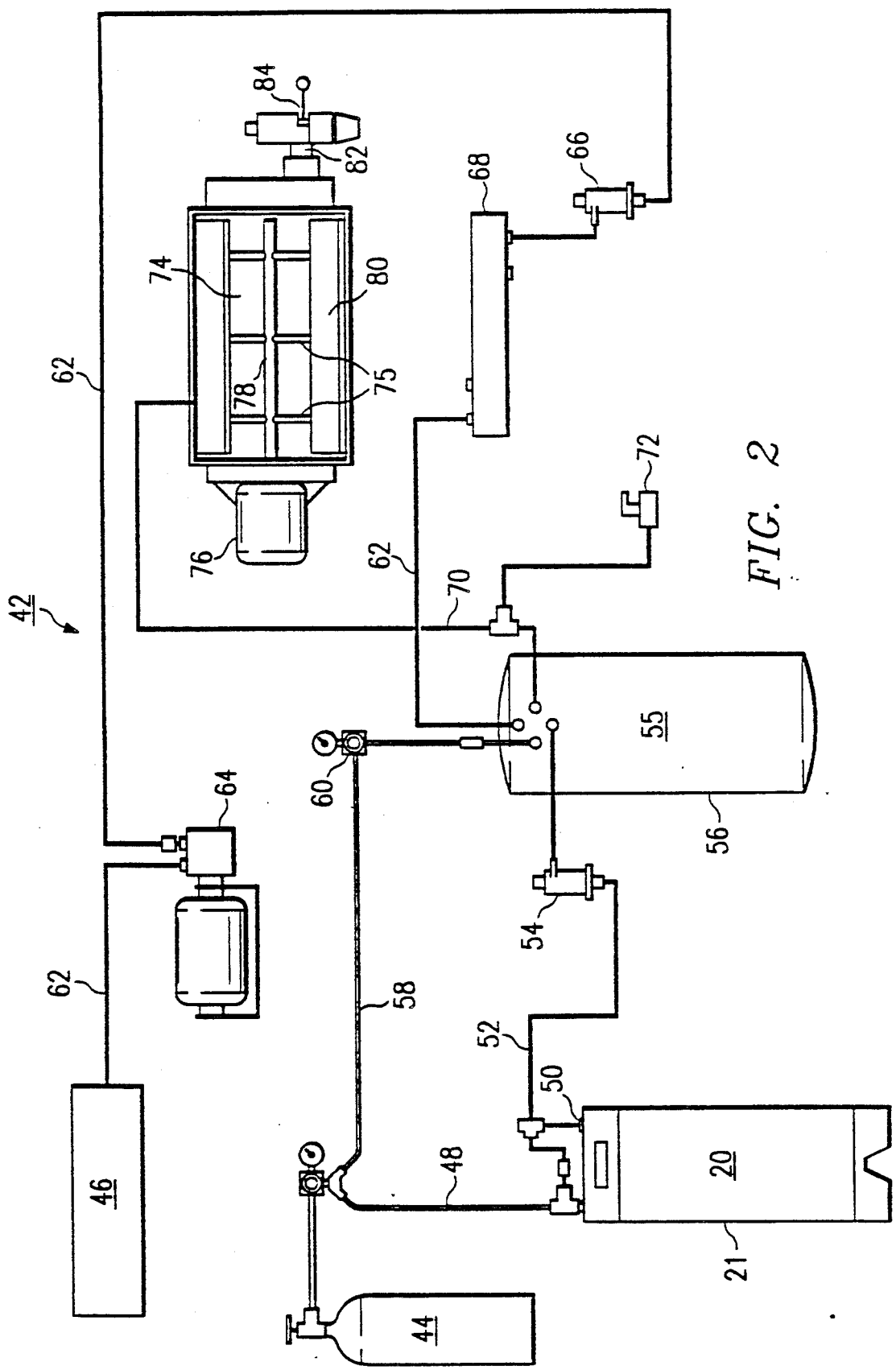
FIG. 2 is a schematic diagram of exemplary apparatus suitable for creating a low calorie beverage having small ice crystals dispersed throughout the beverage.

Referring now to FIG. 2, a schematic diagram of an exemplary apparatus 42 which forms the final low calorie beverage can be seen. A canister 21 containing syrup solution 20 is coupled to a carbon dioxide source 44 by a carbon dioxide line 48. Likewise, canister 21 is connected to a blending tank 56 by a line 52 which has a flow regulator 54 coupled thereon for controlling the flow rate of syrup solution 20 to blending tank 56. Carbon dioxide source 44 is coupled to blending tank 56 via line 58 which has a pressure regulator 60 attached thereon. A water source 46 is connected to a water pump 64 by a line 62. The discharge end of pump 64 is connected to a flow regulator 66 by line 62. Flow regulator 66 is coupled to a pre-cooled plate 68. Finally, water line 62 connects pre-cooled plate 68 to blending tank 56.

A line 70 connects blending tank 56 to a freeze cylinder 74. Internally, freeze cylinder 74 has a shaft 78 coupled to a motor 76. Shaft 78 has a plurality of connectors 75 integrally formed with a plurality of blades 80. Finally, freeze cylinder 74 is connected to a dispensing valve 84 by a line 82.

In its operation, canister 21 containing syrup solution 20 is connected to transfer syrup solution 20 to blending tank 56. Along with syrup solution 20, carbon dioxide and water are added to blending tank 56 to create a final mixture 55 necessary to produce the low calorie beverage.

As can be seen in the drawing, carbon dioxide is transported through carbon dioxide line 48 to pressurize canister 21. After pressurization of canister 21, syrup solution 20 is transported out of an opening 50 through line 52. Syrup flow regulator 54 is used to control the rate of flow into blending tank 56.

While syrup 20 is being transported to blending tank 56, a stream from water source 46 is being transported through line 62 to water pump 64. Once water has been pressurized through pump 64, water is transported through line 62 to pre-cooled plate 68. Flow regulator 66 permits adjustments to the rate of water 46 being passed through pre cooled plate 68. After initial cooling has been conducted, a stream from water source 46 is injected into blending tank 56. In a preferred embodiment, the ratio of syrup to water is 1:4.5.

To provide the necessary carbonation of the solution, carbon dioxide from source 44 is transported through line 58 to pressure flow regulator 60. From pressure regulator 60, carbon dioxide is passed into blending tank 56.

A pre-cooled, low calorie beverage mixture 55 is contained within blending tank 56. This pre-cooled mixture 55 is passed through line 70 to freeze cylinder 74. A product sample valve 72 is connected to line 70 to allow the operator to provide proper quality control of the product.

In freeze cylinder 74, motor 76 continuously rotates shaft 78. Blades 80 continuously scrape the wall of freeze cylinder 74 to insure that there is no build-up of ice on the wall. In its operation, freeze cylinder 74 is held at a temperature range between approximately 26 to 28 degrees Fahrenheit. Once the solution is held in freeze cylinder 74 for approximately 10 minutes, the desired slushy consistency of small ice crystals evenly distributed throughout mixture 55 is obtained. Finally, mixture 55 is passed through line 82 to valve 84 to discharge the low calorie beverage for consumption.

In the prior art, because of the inability to have a low-calorie solution capable of withstanding temperatures as low as 26 to 28 degrees Fahrenheit, freeze cylinder 74 would freeze up and cause damage to blades 80, shaft 78 and motor 76. Additionally, prior to the use of the present invention, line 82 and valve 84 would freeze up because of the icing characteristics of the artificially sweetened solution when submitted to a temperature below 32 degrees Fahrenheit.

An example of the preferred embodiment is presented for illustration below.

EXAMPLE

Initially, 288 gallons of filtered water, 5 pounds of aspartame, and 4 pounds of sodium benzoate were added to a mixer and stirred until all the solids were completely dissolved. Next, 75 pounds of Avicel CL-611 microcrystalline cellulose were added and vigorously agitated for 15 minutes. A premixed solution having 7.3 gallons of propylene glycol and 7.44 pounds of xanthan gum manufactured by Kelco Company (trademark Keltrol-F) was added to the mixer and mixed for 5 minutes. While the mixer continued to rotate, 139 gallons of high fructose corn syrup having 71 weight percent fructose and dextrose was added to the mixer. Next, 122 fluid ounces of 50% yucca extract and 50% quillaia extract were added to the mixer. Finally, 14.0625 gallons of cola flavoring were added to the mixer to create the final syrup product. The syrup had a refractometer Brix index number of 29.0 and a pH of 2.6. The density of the syrup solution was 9.32 pounds per gallon and it had a dark brown coloring.

After the syrup was mixed with water at a ratio of 1:4.5 syrup to water, it was mixed with carbon dioxide. The solution of syrup, water and carbon dioxide was stirred at a temperature of 27° F. in the freeze cylinder of a semi-frozen beverage making machine manufactured by Cornelius Corporation until the desirable consistency was obtained. The beverage was smooth in the mouth and its texture resembled the conventional beverage having a high natural sweetener concentration. In its final form, its volume increased by approximately 100% due to carbon dioxide entrainment.

In summary, an advantageous low calorie beverage has been disclosed that features the use of a microcrystalline cellulose and which has a semi-frozen consistency when reduced to a temperature range between 26 to 28 degrees Fahrenheit. It has been found that the total calorie content can be reduced by approximately 55 percent. Specifically, it has been found that the present invention contains approximately 6% natural sweetener as compared to 13% natural sweetener when artificial sweeteners are not used. These figures can be further improved by replacing the natural sweeteners used in the present invention with either Sorbitol or polydextrose.

While preferred embodiments of the invention and their advantages have been disclosed in the above-detailed description, the invention is not limited thereto but only by the spirit and scope of the appended claims.

What is claimed is:

1. A low calorie semi-frozen beverage comprising:
    water, a substantial portion of said water taking the form of ice crystals which are sufficiently small that the beverage has a velvety mouthfeel;
    a syrup comprising:
        an artificial sweetener;
        microcrystalline cellulose in sufficient quantity to lower the freezing point of said beverage and cause the formation of said small ice crystals upon freezing at a temperature between 26 and 28 degrees Fahrenheit, said microcrystalline cellulose hydrated by and dispersed throughout said solution to form a colloidal suspension;
        a natural sweetener;
        a foaming agent including saponin for stabilizing foam created upon later agitation of said water and said syrup; and
        a flavoring for providing the desired taste to said beverage; and
    carbon dioxide.

2. The low calorie beverage of claim 1, and further comprising:
    a gum for maintaining said suspension and for increasing the viscosity of said syrup; and
    a wetting agent for wetting said gum, said wetting agent lowering the freezing point of said syrup.

3. The low calorie beverage of claim 2, wherein said syrup comprises:
    0.50 to 2.00 percent wetting agent by weight; and
    0.15 to 0.25 percent gum by weight.

4. The low calorie beverage of claim 2 wherein said syrup comprises:
    approximately 0.18 percent gum by weight; and
    approximately 0.75 percent wetting agent by weight.

5. The low calorie beverage of claim 2, wherein said gum is selected from the group consisting of xanthan gum and gum tragacanth.

6. The low calorie beverage of claim 2, wherein said wetting agent is selected from the group consisting of propylene glycol, glycerine and polysorbate.

7. The low calorie beverage of claim 1, wherein said syrup comprises:
    50.0 to 60.0 percent water by weight;
    0.11 to 0.13 percent artificial sweetener by weight;
    1.50 to 2.50 percent microcrystalline cellulose by weight; and
    27.3 to 47.3 percent natural sweetener by weight.

8. The low calorie beverage of claim 1, wherein said syrup comprises:
    approximately 56.8 percent water by weight;
    approximately 0.12 percent artificial sweetener by weight; and
    approximately 37.3 percent natural sweetener.

9. The low calorie beverage of claim 1, wherein said artificial sweetener is selected from the group consisting of aspartame and saccharin.

10. The low calorie beverage of claim 1, wherein said natural sweetener is selected from the group consisting of fructose, dextrose, sucrose, malto-dextrin and polydextrose solution.

11. The low calorie beverage of claim 10, wherein said natural sweetener includes 71.0 percent fructose.

12. The low calorie beverage of claim 1, wherein said foaming agent comprises 50 percent yucca extract and 50 percent quillaia extract.

13. A low calorie foamy slush beverage formed by a process comprising the steps of:
preparing a syrup, said step of preparing a syrup comprising the substeps of:
forming an aqueous solution including an artificial sweetener selected from the group consisting of aspartame and saccharin, the quantity of artificial sweetener preselected such that the artificial sweetener will comprise between 0.11 and 0.13 percent by weight of the syrup;
after said substep of forming a solution, mixing microcrystalline cellulose with the solution to form a colloidal suspension, the quantity of microcrystalline cellulose preselected such that the microcrystalline cellulose will comprise between 1.50 and 2.50 percent by weight of the syrup, such that the freezing point of the foamy slush beverage will be lowered and such that small ice crystals will be formed upon freezing;
mixing a gum with propylene glycol to form a wetted gum, the quantity of gum preselected such that the gum will comprise between 0.15 and 0.25 percent of the syrup and the quantity of propylene glycol preselected such that the propylene glycol will comprise between 0.50 and 2.00 1 percent by weight of the syrup;
after said substeps of forming a colloidal suspension and a wetted gum, mixing the wetted gum with the colloidal suspension to form a stabilized colloidal suspension having increased viscosity;
after said substep of forming a stabilized colloidal suspension, mixing a natural sweetener with the stabilized colloidal suspension, the quantity of natural sweetener preselected such that the natural sweetener will comprise between 27.3 and 47.3 percent by weight of the syrup;
after said substep of mixing natural sweetener with the stabilized colloidal suspension, mixing a foaming agent comprising saponin with the stabilized colloidal suspension and the natural sweetener, the quantity of foaming agent preselected such that foam created upon agitation of the syrup with water and carbon dioxide remains stable;
after said substep of mixing the foaming agent with the stabilized colloidal suspension and the natural sweetener, mixing in a flavoring to provide the desired taste to the beverage and to complete the syrup;
after said step of preparing a syrup, adding water to the syrup at a ratio of approximately 4.5:1 to create a mixture;
after said step of creating a mixture, adding carbon dioxide to the mixture for creating a pre-cooled beverage mixture; and
subjecting the pre-cooled mixture to a temperature between about 26 and 28 degrees Fahrenheit while the pre-cooled mixture is being agitated, small ice crystals being formed evenly throughout the pre-cooled beverage mixture to create the foamy slush beverage having a velvety mouthfeel.

14. A process for preparing a low calorie beverage syrup for the later manufacture of a low calorie foamy slush beverage having a velvety mouthfeel, comprising the steps of:
forming an aqueous solution including an artificial sweetener selected from the group consisting of aspartame and saccharin;
after said step of forming a solution, mixing microcrystalline cellulose with the solution to form a colloidal suspension, the microcrystalline cellulose mixed into the solution in such a quantity as to lower the freezing point of the later manufactured slush beverage and to form small ice crystals when the syrup is mixed with water and carbon dioxide and frozen at a temperature of between about 26 and about 28 degrees Fahrenheit;
mixing a gum with a wetting agent to form a wetted gum;
after said steps of forming a colloidal suspension and a wetted gum, mixing the wetted gum with the colloidal suspension to form a stabilized colloidal suspension;
after said step of forming a stabilized colloidal suspension, adding a natural sweetener to the stabilized colloidal suspension;
after said step of adding a natural sweetener, adding a foaming agent to the stabilized colloidal suspension in such a quantity as to maintain a foam created when the syrup is mixed with water and carbon dioxide and frozen at a temperature of between about 26 and 28 degrees Fahrenheit; and
after said step of adding a foaming agent, adding a flavoring to provide the desired taste to the later manufactured beverage.

15. The process of claim 14, and further comprising the step of adding citric acid to the stabilized colloidal suspension after said step of adding a flavoring.

16. A low calorie beverage syrup comprising:
an artificial sweetener;
microcrystalline cellulose in sufficient quantity to lower the freezing point of a later manufactured beverage and cause the formation of said small ice crystals upon freezing at a temperature between 26 and 28 degrees Fahrenheit, said microcrystalline cellulose hydrated by and dispersed throughout said solution to form a colloidal suspension;
a gum for maintaining said suspension and for increasing the viscosity of said syrup;
propylene glycol for wetting said gum and for lowering the freezing point of said later manufactured beverage;
a foaming agent including saponin for stabilizing foam created up later agitation of said syrups with water and carbon dioxide; and
a flavoring for providing the desired taste to said beverage.

17. A low calorie beverage syrup for use in the later manufacture of a low calorie foamy slush beverage formed by the process comprising the steps of:
forming an aqueous solution including an artificial sweetener selected from the group consisting of aspartame and saccharin, the quantity of artificial sweetener preselected such that the artificial sweetener will comprise between 0.11 and 0.13 percent by weight of the syrup;
after said step of forming a solution, mixing microcrystalline cellulose with the solution to form a colloidal suspension, the quantity of microcrystalline cellulose preselected such that the microcrystalline cellulose will comprise between 1.50 and 2.50 percent by weight of the syrup, such that the freezing point of the foamy slush beverage will be lowered and such that small ice crystals will be formed upon freezing;

mixing a gum with propylene glycol to form a wetted gum, the quantity of gum preselected such that the gum will comprise between 0.15 and 0.25 percent of the syrup and the quantity of propylene glycol preselected such that the propylene glycol will comprise between 0.50 and 2.00 percent by weight of the syrup;

after said steps of forming a colloidal suspension and a wetted gum, mixing the wetted gum with the colloidal suspension to form a stabilized colloidal suspension having increased viscosity;

after said step of forming a stabilized colloidal suspension, mixing a natural sweetener with the stabilized colloidal suspension, the quantity of natural sweetener preselected such that the natural sweetener will comprise between 27.3 and 47.3 percent by weight of the syrup;

after said step of mixing natural sweetener with the stabilized colloidal suspension, mixing a foaming agent comprising saponin with the stabilized colloidal suspension and the natural sweetener, the quantity of foaming agent preselected such that foam created upon agitation of the syrup with water and carbon dioxide remains stable; and after said step of mixing the foaming agent with the stabilized colloidal suspension and the natural sweetener, mixing in a flavoring to provide the desired taste to the beverage and to complete the syrup.

18. The syrup of claim 17 wherein the process further comprises the step of:

after said step of mixing in a flavoring, mixing in citric acid.

* * * * *

UNITED STATES PATENT AND TRADEMARK OFFICE
CERTIFICATE OF CORRECTION

PATENT NO. : 5,069,924
DATED : December 3, 1991
INVENTOR(S) : John B. Baccus, Jr.

It is certified that error appears in the above-identified patent and that said Letters Patent is hereby corrected as shown below:

Column 4, line 57, insert ----- between pre and cooled.

Column 7, line 31, delete "1".

Column 8, line 51, delete "up" and insert --upon-- therefor.

Signed and Sealed this

Seventeenth Day of August, 1993

Attest:

BRUCE LEHMAN

Attesting Officer     Commissioner of Patents and Trademarks